US009457465B2

(12) United States Patent
Schank

(10) Patent No.: US 9,457,465 B2
(45) Date of Patent: Oct. 4, 2016

(54) HYBRID TAPE FOR ROBOTIC TRANSMISSION

(75) Inventor: Troy C. Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 202 days.

(21) Appl. No.: 13/460,420

(22) Filed: Apr. 30, 2012

(65) Prior Publication Data

US 2012/0289371 A1 Nov. 15, 2012

Related U.S. Application Data

(60) Provisional application No. 61/484,742, filed on May 11, 2011.

(51) Int. Cl.
*B25J 9/10* (2006.01)
*F16G 1/26* (2006.01)
*F16G 1/22* (2006.01)

(52) U.S. Cl.
CPC .............. *B25J 9/104* (2013.01); *F16G 1/22* (2013.01); *F16G 1/26* (2013.01); *Y10T 428/24942* (2015.01)

(58) Field of Classification Search
CPC ........... B16G 15/34; B16G 1/26; F16H 5/16; F16G 1/22; B25J 9/104
USPC ....... 474/237, 262, 263, 264, 266, 270, 272, 474/273; 198/847; 74/490.04
See application file for complete search history.

(56) References Cited

U.S. PATENT DOCUMENTS

| | | | | |
|---|---|---|---|---|
| 2,167,384 A | * | 7/1939 | Freedlander | 474/250 |
| 2,511,581 A | * | 6/1950 | Grigsby | 198/847 |
| 2,793,150 A | * | 5/1957 | George | 198/847 |
| 3,315,704 A | * | 4/1967 | Shire | 138/121 |
| 3,783,704 A | * | 1/1974 | Lawson | 474/254 |
| 3,830,113 A | * | 8/1974 | Bruns | 474/251 |
| 3,889,545 A | * | 6/1975 | Baublys et al. | 474/205 |
| 4,004,467 A | * | 1/1977 | Kenney | 198/321 |

(Continued)

FOREIGN PATENT DOCUMENTS

EP 0392850 A2 10/1990
FR 2218000 A5 9/1974

(Continued)

OTHER PUBLICATIONS

Chinese Examination Report in related Chinese patent application No. 2012101405932, mailed Feb. 25, 2014, 10 pages.
Extended European Search Report from the European Patent Office in related European Application No. 12167312, mailed Oct. 25, 2012, 7 pages.

(Continued)

*Primary Examiner* — Minh Truong
(74) *Attorney, Agent, or Firm* — James E. Walton

(57) ABSTRACT

The hybrid tape includes an outer member that is formed with a material having desirable tensile qualities, such that the outer member is tailored to exhibit superior fatigue performance in tension induced from bending. The hybrid tape further includes an inner member that is formed with a material having desirable compression qualities, such that the inner member is tailored to exhibit superior fatigue performance in compression induced from bending. The hybrid tape is configured such that the bend neutral axis is located between the inner material and the outer material, thereby insuring the outer material only experiences tension in bending while the inner material only experiences compression in bending.

2 Claims, 5 Drawing Sheets

(56) References Cited

U.S. PATENT DOCUMENTS

| | | | | |
|---|---|---|---|---|
| 4,022,071 | A | * | 5/1977 | Abatemarco ................ 474/262 |
| 4,250,223 | A | * | 2/1981 | Cook .......................... 442/233 |
| 4,342,561 | A | | 8/1982 | Braybrook |
| 4,553,951 | A | * | 11/1985 | Pavone ........................ 474/148 |
| 4,648,857 | A | * | 3/1987 | David et al. ................. 474/272 |
| 4,708,703 | A | * | 11/1987 | Macchiarulo et al. ....... 474/268 |
| 4,773,896 | A | * | 9/1988 | Bouteiller et al. ........... 474/242 |
| 5,456,639 | A | * | 10/1995 | Herbert et al. ............... 474/237 |
| 5,778,730 | A | * | 7/1998 | Solomon et al. .......... 74/490.04 |
| 7,419,050 | B2 | * | 9/2008 | Westerkamp et al. ........ 198/847 |
| 2010/0240809 | A1 | | 9/2010 | Yamada |

FOREIGN PATENT DOCUMENTS

| | | |
|---|---|---|
| JP | 52149962 U | 11/1977 |
| TW | 201719 A | 3/1993 |

OTHER PUBLICATIONS

Office Action dated Aug. 15, 2014 from counterpart CA App. No. 2,775,667.

Office Action dated Sep. 5, 2014 from counterpart CN App. No. 2012101405932.

Office Action dated Feb. 15, 2015 from counterpart CN App. No. 2012101405932.

* cited by examiner

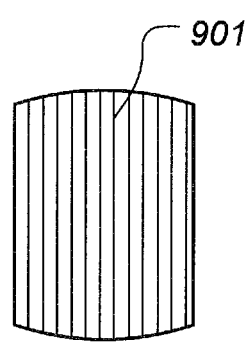
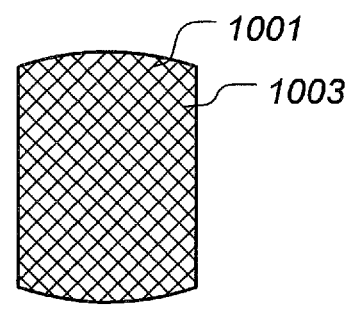
FIG. 9    FIG. 10

HYBRID TAPE FOR ROBOTIC TRANSMISSION

BACKGROUND

1. Technical Field

The present application relates to a hybrid drive tape for robotic transmission. The hybrid tape is configured to have an optimal bending fatigue life.

2. Description of Related Art

Typically, certain robotic transmissions may use tension elements as an efficient method of transferring actuators forces and motion. Tension elements are appealing due to their relative simplicity while exhibiting low mass and high stiffness. Typically, tension elements may include synthetic ropes, metal cables, or even metal tapes.

Ropes, cables, and tapes allow bending over small diameter pulleys in space constrained applications. One shortcoming of ropes and cables is that the fibers or wires flex and abraid each other when they are cyclically bent over a pulley. This abraiding action is worsened by the degree of tension in the rope or cable, as well as by the degree of curvature of the pulleys they wrap around. As the numbers of bending cycles accumulate, the strands eventually saw through themselves and the rope or cable either stretches too much or breaks.

Metal tapes are solid elements that structurally deform when bent around a pulley. Metal tapes are often favorable over ropes and cables because the abrasion scenario is avoided. However, the cyclic bending causes fatigue in the metal and cracks that may lead to eventual breaking. For applications with very high frequency motions, bending cycles are accumulated rapidly and fatigue limits are a major constraint.

Hence, there is a need for an improved robotic transmission element.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

FIG. 9 is a detail view of a portion of the hybrid tape, taken from FIG. 1, according to an embodiment of the present application; and FIG. 10 is a detail view of a portion of the hybrid tape, taken from FIG. 1, according to an embodiment of the present application.

DESCRIPTION OF THE PREFERRED EMBODIMENT

The system of the present application includes a hybrid tape constructed of two or more separate materials. The two materials are combined so that each material is optimized in accordance with the type of loading each experiences during bending, thereby significantly extending the fatigue life of the hybrid tape. In one implementation, the hybrid tape is used in a transmission element within a rotor blade on a rotorcraft.

Figure 1:
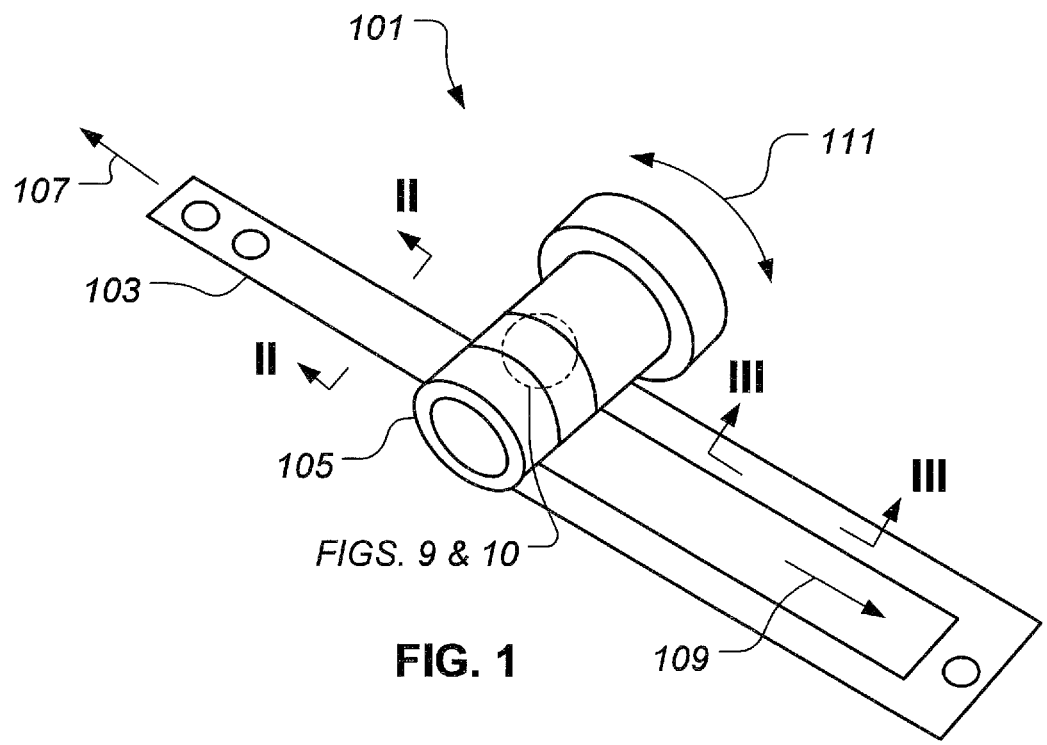
FIG. 1 is a schematic perspective view of a transmission system having a drive tape according to an illustrative embodiment of the present application.

Referring to FIG. 1, an exemplary transmission system 101 is illustrated in conjunction with a hybrid tape 103. In the embodiment illustrated, linear motion of hybrid tape 103 is transformed into rotary motion of a rotary drive element 105. Hybrid tape 103 is wrapped around rotary drive element 105 such that a movement of hybrid tape 103 in either a direction 107 or 109 results in a rotation 111 of rotary drive element 105. Because a portion of hybrid tape 103 is in bending around the radial contour of rotary drive element 105, an inner part of hybrid tape 103 is in compression while an outer part of hybrid tape 103 is in tension. As further discussed herein, hybrid tape 103 is configured so the compressive bending forces act upon a first material having desirable compressive qualities, while the tensile bending forces act upon a second material having desirable tensile qualities.

It should be appreciated that transmission system 101 is merely exemplary of a wide variety of systems for which hybrid tape 103 may be implemented. Hybrid tape 103 may take on a wide variety of geometries. Further, hybrid tape 103 may be divided into multiple segments. In some embodiments, hybrid tape 103 may only interact along a segment of rotary drive element 105. For example, hybrid tape 103 may only wrap around a partial circumference, or arc, of rotary drive element 105. Further, hybrid tape 103 may even be coupled to other parts of a transmission system, such as a hammer mechanism configured to transform linear movement in one direction into rotational movement in a different direction. Hybrid tape 103 may also be implemented in a transmission system having multiple rotary drive elements in series. It should also be appreciated that rotary drive element 105 need not be cylindrical, rather rotary drive element 105 may be of a variety of shapes and geometries. For example, rotary drive element 105 may have a cam-shaped feature configured to produce an eccentric or irregular rotary movement.

It should also be appreciated that hybrid tape 103 is particularly well suited for implementations dealing with high frequency cyclic movements that may otherwise result in premature failure of a conventional tape due to fatigue. Hybrid tape 103 is configured to tolerate high frequency bending cycles without prematurely succumbing to fatigue failure.

Figure 2:
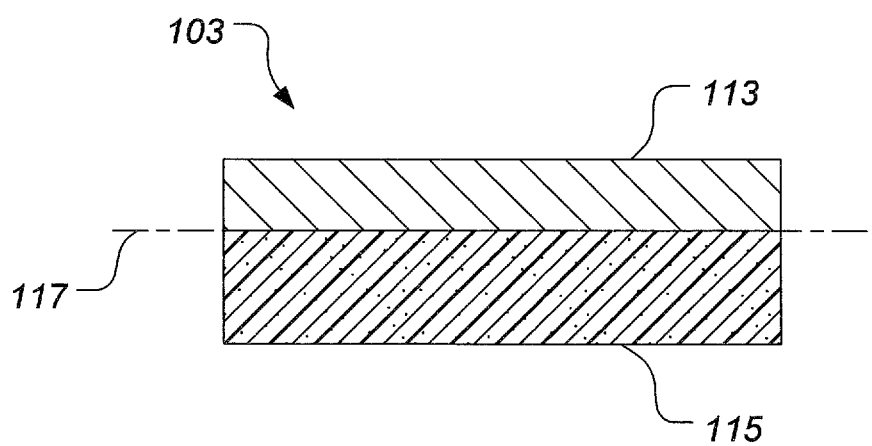
FIG. 2 is a cross-sectional view of a hybrid tape, taken at section lines II-II, according to the preferred embodiment of the present application.
Figure 3:
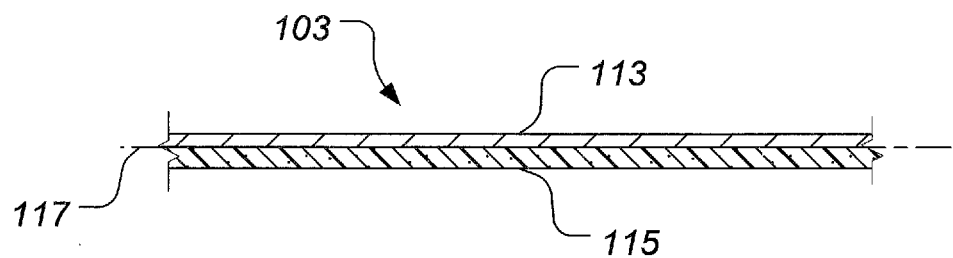
FIG. 3 is a cross-sectional view of the hybrid tape, taken at section lines III-III, according to the preferred embodiment of the present application.
Figure 4:
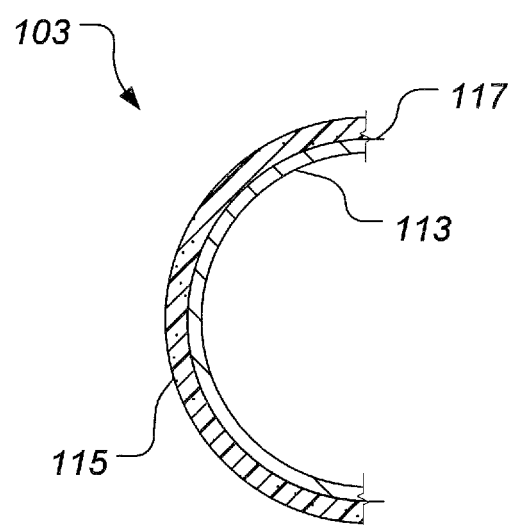
FIG. 4 is a cross-sectional view of the hybrid tape while in a deflected state, according to the preferred embodiment of the present application.

Referring to FIGS. 2-4, hybrid tape 103 includes an inner member 113 and an outer member 115. Inner member 113 is formed with a material having desirable compressive qualities, such that inner member 113 is tailored to exhibit superior fatigue performance in compression induced bending. For example, inner member 113 can be formed with a metallic material, such as steel, titanium, aluminum, to name a few. In the illustrated embodiment, inner member 113 is formed with 17-7 TH1050 stainless steel and has a thickness of approximately 0.002 inch.

Outer member 115 is formed with a material having desirable tensile qualities, such that outer member 115 is tailored to exhibit superior fatigue performance in tension induced bending. For example, outer member 115 can be formed with a composite material comprising of fibers in a matrix material, such as a weave of composite fibers disposed in a resin solution. It should be appreciated that the specific composite material is implementation specific and may be of a wide variety of composite systems known by one skilled in the art. In the illustrated embodiment, outer member 115 has a thickness of approximately 0.0037 inch and is formed with S2 fiberglass fibers disposed in an E773 epoxy resin matrix. Fibers in a composite material are particularly well suited for load scenarios in which the fibers are being stretched rather than being pushed. As such, composite materials are ideal as a material composition for outer member 115, which is subjected to tension when tape 103 is radially bent around rotary drive element 105.

Hybrid tape 103 is configured such that a bend neutral axis 117 is located at or near the transition between inner member 113 and outer member 115. Bend neutral axis 117 is an axis in which there are no longitudinal stresses or strains. Further, the bend neutral axis 117 is a line of demarcation between compression/tension stresses and strains. The location of bend neutral axis 117 is dependent in part upon the modulus of elasticity and thickness of inner member 113 and outer member 115. As such, inner member 113 and outer member 115 are each sized and formed of an appropriate material so that bend neutral axis 117 is located at or near the transition between inner member 113 and outer member 115. Such a configuration segregates the bending loads so that inner member 113 is subjected to compressive bending loads while outer member 115 is subjected to tensile bending loads.

Referring to FIG. 4, a portion of hybrid tape 103 is schematically illustrated wrapping around a portion of a rotary drive element, such as rotary drive element 105. As shown in FIG. 4, hybrid tape 103 is in a deflected state such that outer member 115 is in tension, while inner member 113 is in compression. The bend neutral axis 117 is the line of demarcation between compressive and tensile loading due to bending.

One method of manufacturing hybrid tape 103 includes laying up one or more plies of pre-impregnated composite material directly onto inner member 113. The assembly is cured such that the pre-impregnated plies become outer member 115. In such an embodiment of hybrid tape 103, the resin in the pre-impregnated composite plies is relied upon to create a bond between inner member 113 and outer member 115. In other embodiments, such as hybrid tape 501 (illustrated in FIG. 5), an adhesive layer 503 is applied between inner member 113 and outer member 115 during assembly. It should be appreciated that conventional composite manufacturing techniques may be used to manufacture hybrid tape 103, such as vacuum bagging, molding, and autoclave curing, to name a few.

Referring briefly to FIGS. 9 and 10, when outer member 115 is formed with a composite material, the fibers of the composite material can be oriented so as to tailor the modulus of elasticity in bending. Selectively orienting the fibers is a useful tool for tailoring of the modulus of elasticity so as to control the location of bend neutral axis 117 for hybrid tape 103. FIG. 9 illustrates an embodiment of hybrid tape 103 with outer member 115 having longitudinal fibers 901 oriented parallel with the length of the tape. FIG. 10 illustrates another embodiment of hybrid tape 103 with outer member 115 having a first set of fibers 1001 being oriented 45 degrees from a longitudinal axis of hybrid tape 103, as well as a second set of fibers 1003 oriented 90 degrees from the first set up fibers 1001. The embodiment of outer member 115 in FIG. 9 will typically have a higher modulus of elasticity in bending as compared to the embodiment of outer member 115 in FIG. 10, for a given thickness, due to the directions of the fibers. FIGS. 9 and 10 are illustrated to exemplify how the modulus of elasticity of outer member 115 can be tailored by selectively orienting the fibers.

Figure 5:
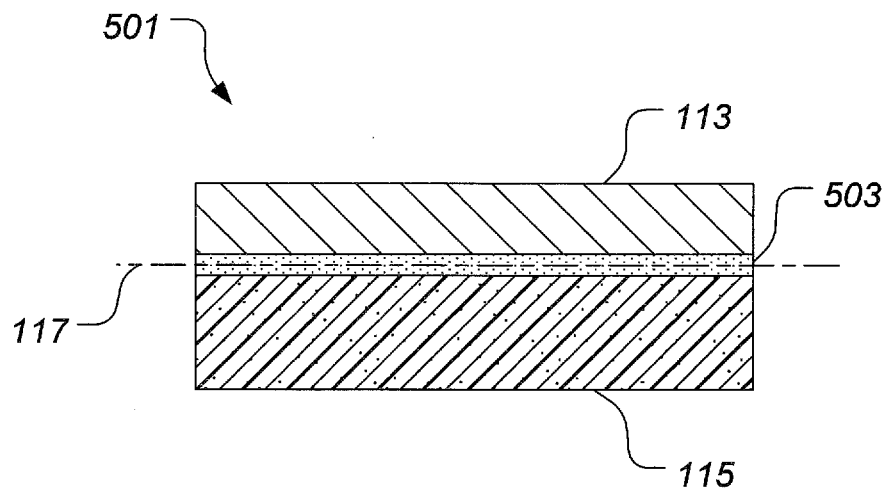
FIG. 5 is a cross-sectional view of a hybrid tape according to an alternative embodiment of the present application.

Referring now to FIG. 5, an alternative embodiment hybrid tape 501 is illustrated. Hybrid tape 501 is similar to hybrid tape 103, except hybrid tape 501 includes an adhesive layer 503 between inner member 113 and outer member 115. Adhesive layer 503 can be used to promote the bond between inner member 113 and outer member 115. Adhesive layer 503 is preferably applied in the form of an adhesive film between inner member 113 and outer member 115. Adhesive layer 503 is preferably cured during a curing cycle in which the adhesive film is subjected to pressure and/or heat. It should be appreciated that adhesives requiring only an ambient pressure/temperature cure may also be used. During the assembly of hybrid tape 501, outer member 115 may be cured prior to assembly with adhesive layer 503 and inner member 113. Alternatively, outer member 115 may be cured along with adhesive layer 503 while being assembled with inner member 113.

Figure 6:
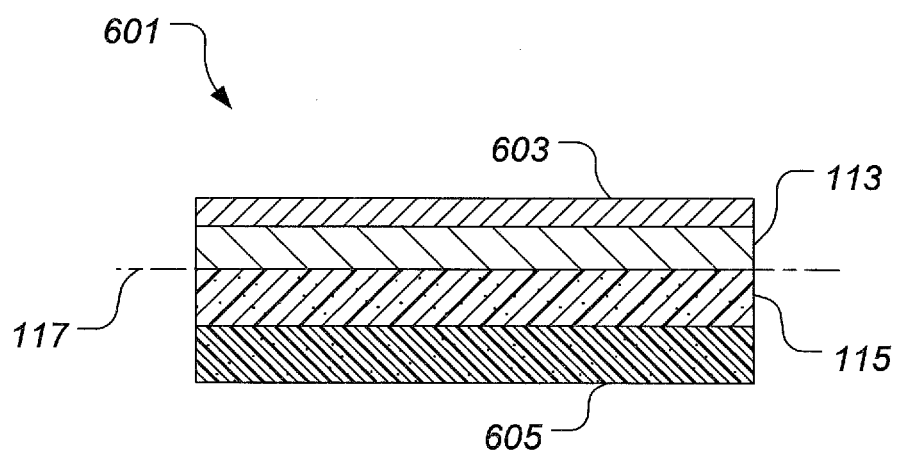
FIG. 6 is a cross-sectional view of a hybrid tape according to an alternative embodiment of the present application.

Referring now to FIG. 6, an alternative embodiment hybrid tape 601 is illustrated. Hybrid tape 601 is similar to hybrid tape 103, except hybrid tape 601 includes a plurality of inner members and a plurality of outer members. As in the case of hybrid tape 103, inner members have desirable compressive characteristics while the outer members have desirable tensile characteristics. Hybrid tape 601 includes an additional outer member 605. Outer member 605 is preferably a composite material having a lower modulus of elasticity and higher strain capability, as compared to outer member 115. For example, if outer member 115 is carbon fiber/epoxy, then outer member 605 can be a fiberglass/epoxy. Similarly, hybrid tape 601 includes an additional inner member 603. Inner member 603 is preferably a metallic member having a lower modulus of elasticity than that of inner member 113. For example, if inner member 113 is stainless steel, then inner member 603 can be titanium. An adhesive layer may be used between inner member 113 and inner member 603. Hybrid tape 601 is particularly well suited for the tailoring of the location of bend neutral axis 117. Further, having multiple inner members and/or outer members allows hybrid tape 601 to be configured with greater optimization of total tape thickness and neutral bend axis location. Further, it should be appreciated that hybrid tape 601 may only have a single outer member, such as outer member 115. Similarly, it should be appreciated that hybrid tape 601 may only have a single inner member, such as inner member 113. Furthermore, hybrid tape 601 may have any number of inner and outer members.

Figure 7:
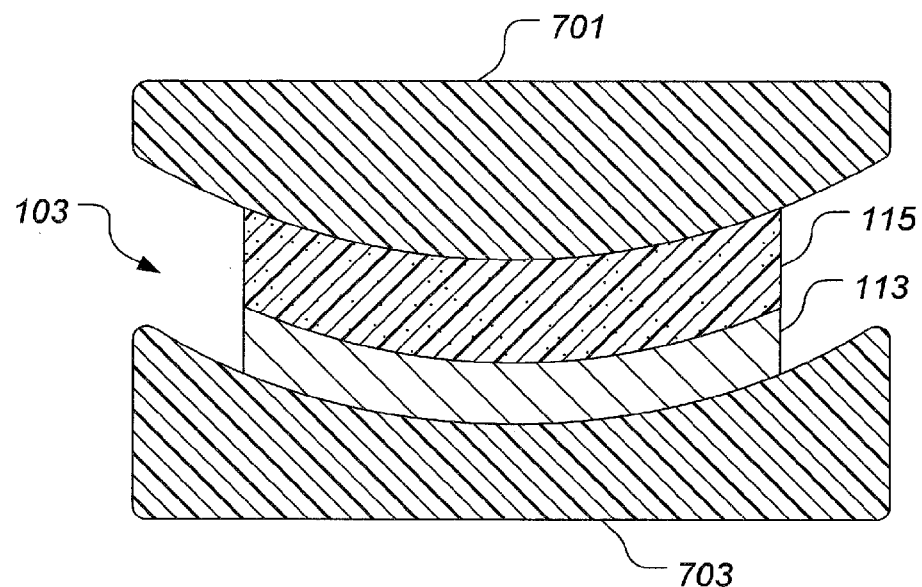
FIG. 7 is a cross-sectional view of a manufacturing embodiment of a hybrid tape according to the present application.

Referring to FIG. 7, one embodiment of hybrid tape 103 includes selectively applying a pre-curve during lay-up assembly and curing. Because the inner member 113 is preferably a metallic material, while outer member 115 is preferably a composite material, inner member 113 will typically have a higher thermal coefficient of expansion. As such, heating the assembly during the curing cycle may cause the inner member 113 to expand widthwise greater than the outer member 115. Subsequent cooling of the assembly may result in a greater contraction of inner member 113 as compared to outer member 115. In order to negate any warping that may otherwise occur, hybrid tape is assembled on a lower mold tool 703 having a concave mold surface, as shown in FIG. 7. Additionally, an upper mold tool 701 may also be used to further shape the upper surface of outer member 115. Lower mold tool 703 forms a pre-curve in inner member 113 and outer member 115 so that the subsequent cooling of inner member 113 and outer member 115 acts to produce a hybrid tape 103 that is flat. The degree of pre-curve in the mold tools is dependent upon the geometry and materials of inner member 113 and outer member 115, as well as the cure temperature.

Figure 8:
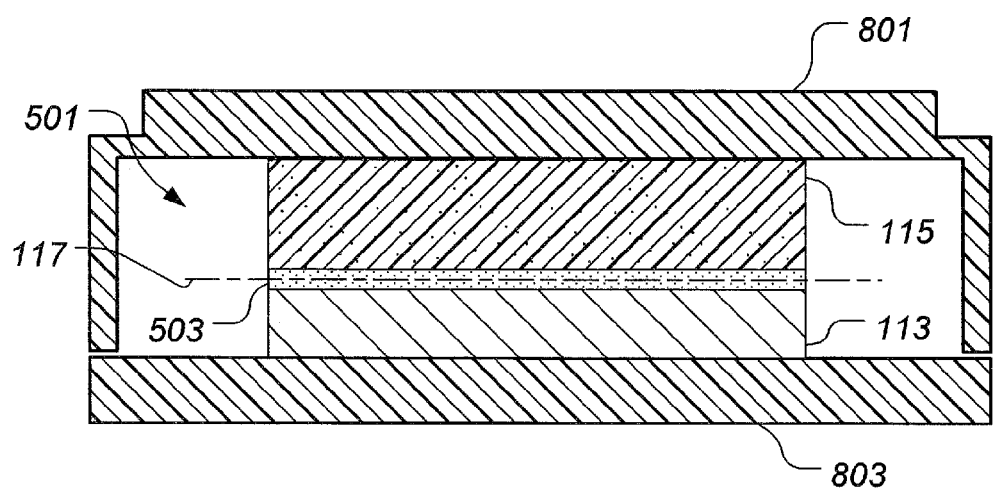
FIG. 8 is a cross-sectional view of a manufacturing embodiment of a hybrid tape according to the present application.

Referring to FIG. 8, hybrid tape 501 can be fabricated by applying inner member 113, adhesive layer 503, and outer member 115 into a closed cavity tool. Note that the illustrated geometric configuration of the closed cavity tool is merely exemplary of the widely diverse geometric configurations of closed cavity tools contemplated. Closed cavity tool preferably has a rigid first tool 801 and a rigid second tool 803. The closed cavity tool preferably has one or more stops that dictate the desired final thickness of hybrid tape 501. During processing, the assembly is heated until the adhesive layer 503 becomes viscous, then first tool 801 and second tool 803 are forced together, causing the adhesive layer to bleed out until the stops are encountered. In an alternative embodiment, rigid first tool 801 and rigid second tool 803 have curved surfaces configured to generate a pre-curve in hybrid tape 501, similar to the embodiment shown in FIG. 7.

The hybrid tape system of the present application provides significant advantages, including: 1) providing a hybrid tape that has superior bending fatigue characteristics; 2) providing a hybrid tape that has a inner member particularly well suited for compression and an outer member that is particularly well suited for tension; 3) tailoring the modulus of elasticity of the composite outer member by selectively orienting the fibers; 4) applying a pre-curve to the hybrid tape assembly during processing; and 5) tailoring the location of the neutral bend axis by selecting the geometry and material of the inner member and outer member so that the outer member experiences only tension while the inner member experiences only compression.

It is apparent that an application with significant advantages has been described and illustrated. Although the present application is shown in a limited number of forms, it is not limited to just these forms, but is amenable to various changes and modifications without departing from the spirit thereof.

The invention claimed is:

1. A hybrid tape for a transmission system, the hybrid tape comprising:
   a first inner member having a first material suited to withstand compressive forces generated from a bending of the hybrid tape, the first inner member being composed of a steel material with a first modulus of elasticity;
   a second inner member secured to the first inner member, the second inner member being composed of titanium with a second modulus of elasticity, the second modulus of elasticity having a lower value than the first modulus of elasticity;
   a first outer member having a second material suited to withstand tensile forces generated from a bending of the hybrid tape, the second material being formed of a carbon fiber material in a resin material, the second material having a third modulus of elasticity, the first outer member being bonded to the first inner member to form the hybrid tape; and
   a second outer member secured to the first outer member, the second outer member being formed of a fiberglass material having a fourth modulus of elasticity that is lower than the third modulus of elasticity;
   wherein the first outer member and the first inner member are each selectively tailored for a specified bending criteria so that the first inner member is subjected to primarily compressive forces while the first outer member is subjected to primarily tensile forces, when the hybrid tape endures bending associated with the specified bending criteria;
   wherein a transition between the first inner member and the first outer member corresponds approximately with a bend neutral axis;
   wherein the bend neutral axis is an axis of demarcation between compressive forces and tensile forces in the hybrid tape during bending; and
   wherein the first inner member and the first outer member are bonded together with the resin material.

2. The hybrid tape according to claim 1, wherein fibers of the carbon fiber material are oriented in selected directions to tailor the modulus of elasticity of the first outer member.

* * * * *